A. STEWART.
POWER STEERING MECHANISM.
APPLICATION FILED AUG. 8, 1918.

1,306,030.

Patented June 10, 1919.
2 SHEETS—SHEET 2.

WITNESS:
J. P. Britt

INVENTOR
Alexander Stewart
BY Geo. S. Young
ATTORNEY

UNITED STATES PATENT OFFICE.

ALEXANDER STEWART, OF CLINTONVILLE, WISCONSIN, ASSIGNOR TO TOPP-STEWART TRACTOR CO., OF CLINTONVILLE, WISCONSIN.

POWER STEERING MECHANISM.

1,306,030.　　　Specification of Letters Patent.　　Patented June 10, 1919.

Application filed August 8, 1918. Serial No. 248,934.

*To all whom it may concern:*

Be it known that I, ALEXANDER STEWART, a citizen of the United States, and resident of Clintonville, in the county of Waupaca and State of Wisconsin, have invented certain new and useful Improvements in Power Steering Mechanisms; and I do hereby declare that the following is a full, clear, and exact description thereof.

My invention is directed to the provision of power steering mechanism for trucks or other vehicles.

It is the object of my invention to provide a simple and efficient power drive mechanism for the steering staff of a truck or similar vehicle in such manner that either a power rotation of the staff or a manual rotation by means of the usual steering wheel may be selectively employed in accordance with the steering conditions involved.

A further and important object resides in the provision of a power drive of this character wherein means is provided for automatically releasing the power upon actuation of the steering mechanism being continued to a desired limit in either direction.

A more detailed object resides in the provision of a power mechanism of this character wherein the power connections are normally idle and held in such idle position to permit manual steering operation.

With the above and other objects and advantages in view, my invention resides more particularly in the novel construction, combination and arrangement of parts, which will be hereinafter described and pointed out in the appended claims.

Figure 1:
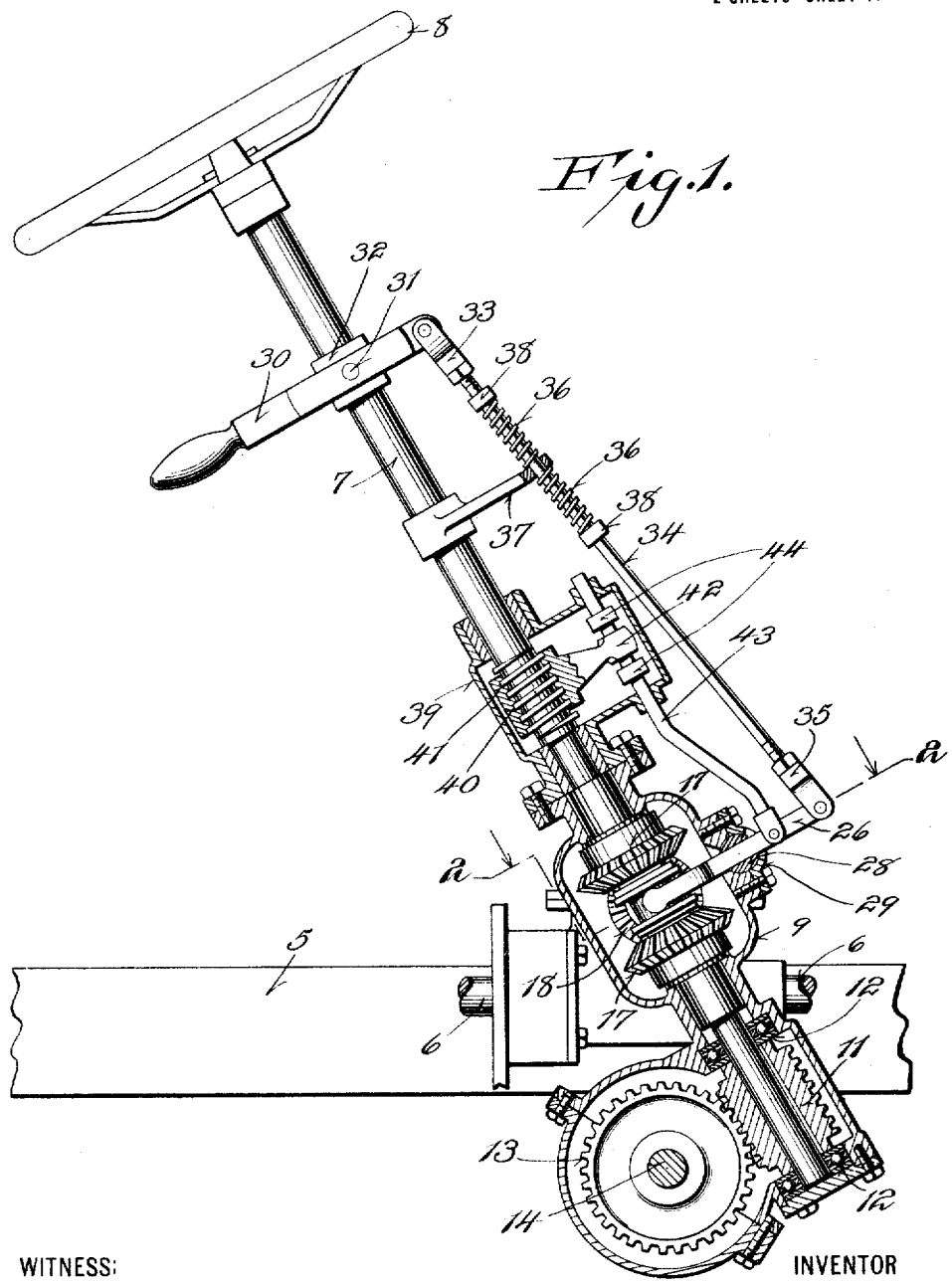
Figure 1 is a vertical sectional view through a selective power and manual steering mechanism embodying my invention.
Figure 2:
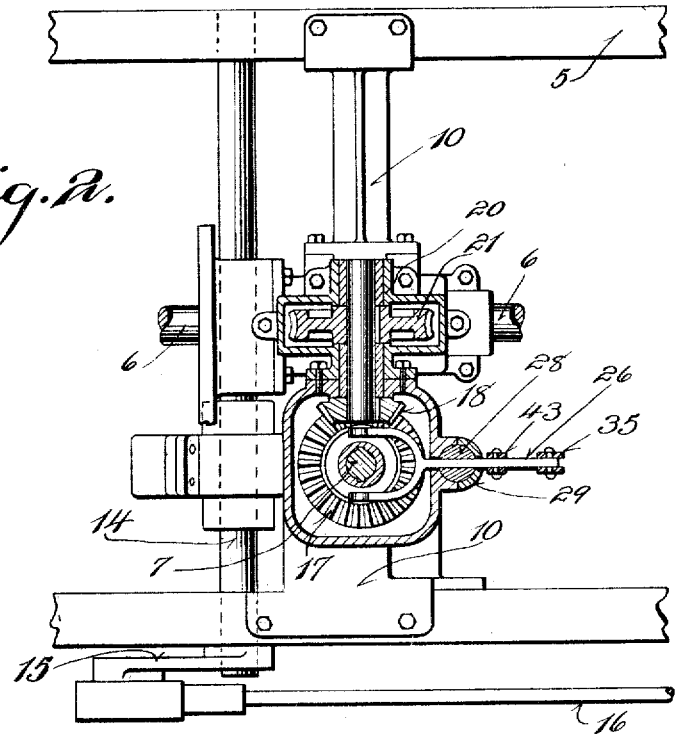
Fig. 2 is a transverse sectional view on the line 2—2 of Fig. 1.
Figure 3:
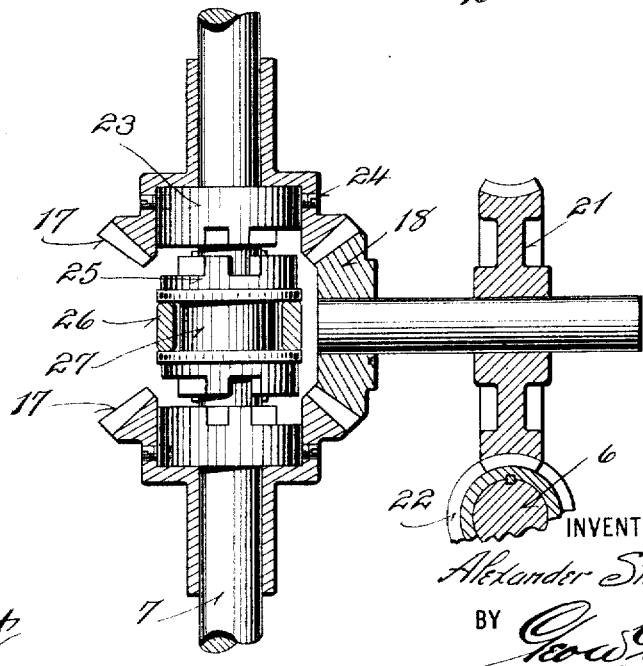
Fig. 3 is an enlarged and fragmentary sectional view showing the reversible drive members and clutch of the steering column.

Referring now more particularly to the accompanying drawings, 5 designates each of the side sills of a truck or other automobile chassis and 6 designates the engine shaft of the vehicle. The steering shaft 7, having its upper portion extending through the usual column and carrying the usual manual steering wheel 8, rises from and is journaled in a casing 9 carried by bracket members 10 secured to the side sills, the upper and lower portions of the casing being enlarged to house the various gears of the power drive mechanism, and the casing being disposed between the power shaft and one of the side sills 5 whereby the steering shaft 7 is afforded its normal upwardly inclined position at one side of the vehicle. A worm 11 is keyed on the lower end of the steering shaft, having end thrust ball bearings 12 in the enlarged lower portion of the casing, and this worm meshes with the worm wheel 13 carried on a shaft 14 extending transversely under the side sills. A crank arm 15 is carried on one end of the shaft and secured to this crank arm 15 is the usual pitman link 16 extending forwardly with respect to the vehicle for connection with the usual steering gear (not shown).

Thus, rotation of the steering shaft 7 in either direction will procure rocking movement of the crank arm 15 to effect the steering operation of the vehicle.

Loosely mounted on the steering shaft in the upper enlarged portion of the casing are a pair of beveled gears 17 having their hubs journaled in reduced intermediate and upper portions of the casing, and these gears are in continuous mesh with a beveled gear 18 carried on a stub shaft 19 which is journaled in a casing 20 secured to the inner side of the casing 9 and disposed about the engine shaft 6. A worm wheel 21 is mounted on the stub shaft within the casing 20 and meshes with a worm 22 keyed on the engine shaft 6 to thus afford a continuous driving rotation of the beveled gear 17 during operation of the vehicle engine. The hubs of the gear 17 are cupped at their inner sides and seating in said cupped portions of the hubs are female clutch members 23 secured to the gear hubs by screws 24 threaded in said hubs, and these clutch members are provided with recesses coacting with corresponding projections on a male clutch member 25 splined on the steering shaft between the clutch members 23, it being noted that the engaging faces of the clutch projections and recesses are parallel to the axis of the steering shaft, the male clutch member 25 normally assuming a neutral position out of mesh with either clutch member 23. A spanner lever 26 is provided for actuating the clutch member 25, having its furcations engaged in an intermediate annular groove 27 in the clutch member, the lever being intermediately pivoted in the forward wall of the casing by passing the lever through and securing it in a ball 28 which is mounted in a spherical socket formed by a cupped forward portion of the casing 9 and a cup plate 29 secured to the casing wall and slotted to permit vertical sliding movement of the lever. To actuate this lever 26 from a point adjacent the steering wheel, a lever 30 is intermediately pivoted to the upper portion of the steering column by means of pintles 31 carried on a collar 32 fixed on the column, the intermediate portion of the lever being branched to embrace the collar and receive said pintles. The rear end of the lever affords a handle and to the forward end of the lever is pivoted a coupling yoke 33 in which is threaded one end of a link 34 which has its other end threaded in a coupling yoke 35 pivoted to the forward end of the lever 26. Thus rocking movement of the lever 30 will procure engagement of the clutch member 25 with either of the clutch members 23 to procure driven rotation of the steering shaft in either direction and the clutch member 25 is yieldably held in, and urged to, neutral position by a pair of springs 36 coiled on the link 34 above and below a bracket arm 37 projecting from the steering column and apertured to receive the link, said springs bearing against the bracket arm and against stop collars 38 on the link above and below the same.

For automatically disengaging the clutch members upon rotation of the steering column shaft 7 in either direction to effect a desired maximum limit of steering operation, a casing 39 is mounted above and secured to the casing 9, and carries the steering column. Within the casing 39 threads 40 are formed on the steering column shaft which are engaged by a threaded collar 41 having apertured arm 42 extending therefrom. Slidably passed through the arm and having bearings in the casing above and below the same is a bar 43 having its lower end pivotally secured to the lever 26 between the coupling 35 and the ball 28. Secured on the bar above and below the arm 42 are stop collars 44, which in the neutral position of the clutch member 25 are equally spaced from the arm, the distance between each collar and the arm being preferably equal to the distance which the clutch member 25 may be moved for clutching engagement in either direction.

In the operation of the automatic releasing mechanism, as the lever 30 is swung to engage the clutch member 25 with either of the clutch members 23, a corresponding one of the stop collars 44 will move to engagement with the arm 42 of the thread collar. Thus, as the steering column shaft 7 rotates, the thread collar 41 will be continuously shifted in a corresponding direction, shifting the rod 43 and slowly moving the clutch 25 out of engagement with the clutch 23, the depth of the clutch projections and recess being such however, that they will remain in engagement and afford a driving rotation of the steering column shaft until a desired permitted limit of steering movement is effected, and if the steering gear is at or adjacent one limit of steering movement, a continuous operation of the driving mechanism is provided for to actuate the steering gear to its other limit of movement.

An exceedingly simple, durable and readily operable power steering mechanism has thus been provided which is particularly adapted for use in connection with heavy types of trucks and which conforms to a maximum extent with standard truck construction.

What is claimed is:

1. The combination with a vehicle including a steering gear, an upstanding steering column, and a shaft in the steering column connected with the steering gear for driving the same, of a pair of gears on the steering column shaft for driving said shaft in opposite directions, and means for procuring selective drive operation of the gears including a control lever pivoted on the steering column.

2. The combination with a vehicle including a steering gear, of an upstanding steering column, a shaft in the steering column connected with said steering gear for driving the same, gears on the steering column shaft for driving said shaft in opposite direction, a selective means for driving said gears including a control lever pivoted on the steering column, a bracket on the steering column, a link connecting said selective gear means and the lever, and means carried by said link and engaging said bracket for urging said selective drive means to neutral position.

3. The combination with a vehicle including a steering gear, a main drive shaft extending longitudinally of the vehicle, and a steering shaft, of a stub shaft, a gear connection between said main shaft and stub shaft, gears loose on the steering shaft, a gear on the stub shaft meshing with said loose gears, and means for selectively clutching said loose gears to the steering shaft.

4. The combination with a vehicle including a steering gear, of an upstanding steering shaft connected with said gear, a steering wheel on said shaft, a selective drive mechanism for driving the shaft in either direction of movement, a collar threaded on the steering shaft, and a connection between said collar and the drive mechanism for moving said mechanism to neutral position at limits of rotative movement of the shaft.

5. The combination with a vehicle steering mechanism including a steering column shaft and a steering wheel on the shaft, of continuously oppositely driven members loosely mounted on the steering column shaft, a clutch splined on the shaft and selectively engageable with said members, a lever pivoted on the column, an operative connection between said lever and the clutch and means for yieldably urging the clutch to neutral position.

6. The combination with a vehicle steering mechanism including a steering column shaft and a steering wheel on the shaft, of continuously oppositely driven members loosely mounted on the steering column shaft, a clutch splined on the shaft and selectively engageable with said members, means for moving the clutch, a collar threaded on the shaft, a stop carried by the collar, a member slidably mounted adjacent the collar and movable with the clutch and stops on said member at the sides of the first-named stop whereby to move said clutch to neutral position in desired limits of rotation of the steering column shaft.

In testimony that I claim the foregoing I have hereunto set my hand at Clintonville, in the county of Waupaca and State of Wisconsin.

ALEXANDER STEWART.

Copies of this patent may be obtained for five cents each, by addressing the "Commissioner of Patents, Washington, D. C."